Jan. 10, 1961 R. S. KNECHT 2,967,684
COMBINATION INFLIGHT REFUELING AND DUMPING FOR HELICOPTERS
Filed Dec. 31, 1958 2 Sheets-Sheet 1
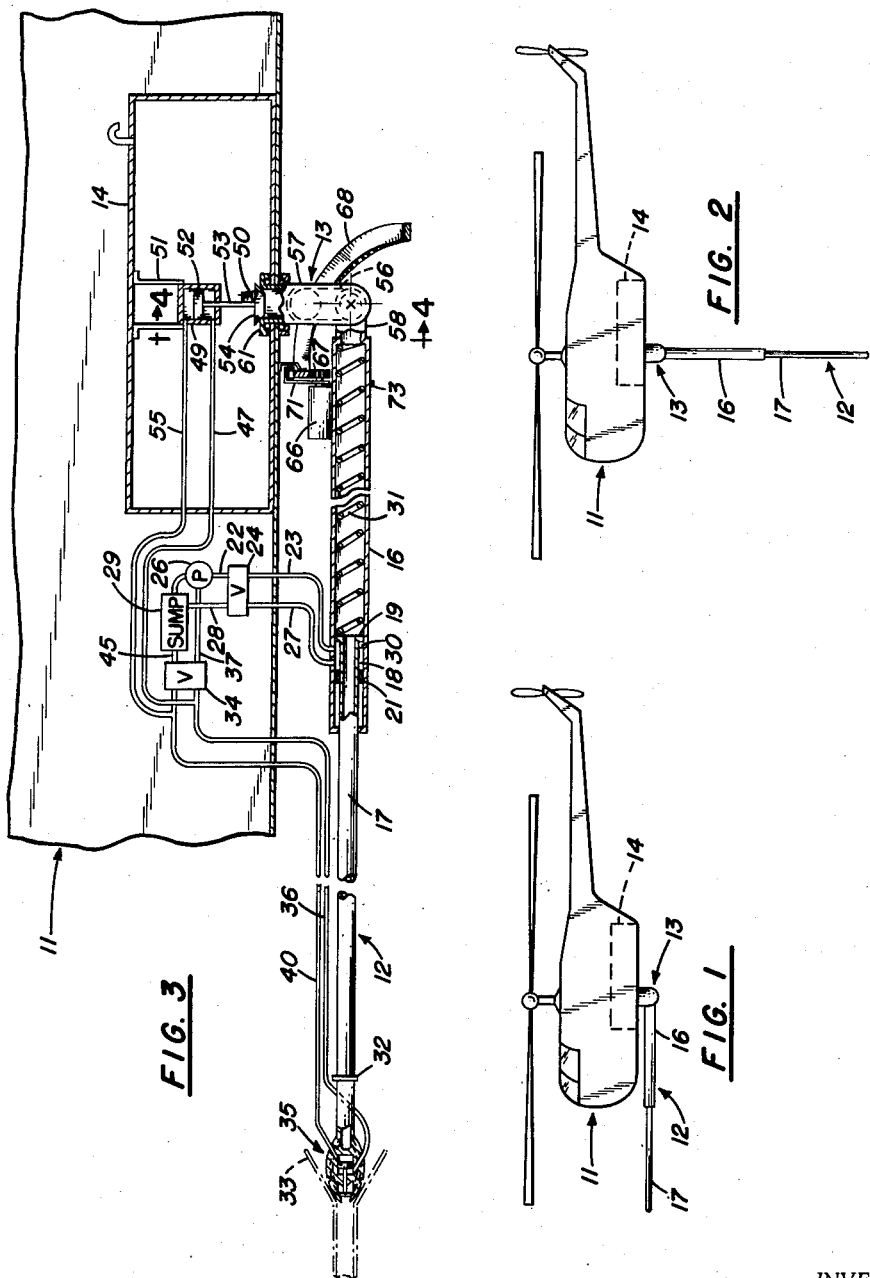
INVENTOR
ROBERT S. KNECHT
BY
ATTORNEY Jan. 10, 1961 R. S. KNECHT 2,967,684
COMBINATION INFLIGHT REFUELING AND DUMPING FOR HELICOPTERS
Filed Dec. 31, 1958 2 Sheets-Sheet 2

INVENTOR
ROBERT S. KNECHT
BY *R. J. Tompkins*
ATTORNEY

United States Patent Office 2,967,684
Patented Jan. 10, 1961

2,967,684

COMBINATION INFLIGHT REFUELING AND DUMPING FOR HELICOPTERS

Robert S. Knecht, 407 E. Wayne Ave., Silver Spring, Md.

Filed Dec. 31, 1958, Ser. No. 784,403

6 Claims. (Cl. 244—136)

(Granted under Title 35, U.S. Code (1952), sec. 266)

The invention described herein may be manufactured and used by or for the Government of the United States of America for governmental purposes without the payment of any royalties thereon or therefor.

The present invention relates to the refueling of and the emergency dumping of fuel from aircraft in flight. More particularly, the present invention relates to a system for helicopters, which system can be arranged either for inflight refueling or for the emergency dumping of fuel.

Since maximum power output is expended during helicopter takeoff rather than under cruise conditions, in flight refueling enables an increase in the payload at takeoff. If the payload is held constant, a commensurate increase in the navigational range of the craft can be realized by in flight refueling. Though means for refueling airplanes in flight are old in the art there are no means currently employed for the inflight refueling of helicopters.

However, in addition, because of the nature of the flow of air around the helicopter rotor a second problem presents itself in helicopter flight, the problem of maintaining a safe environment about the craft during the emergency dumping of fuel. To reduce the hazard of fire and fumes it is necessary that any discharge of fuel be made at a distance from the craft. In order to provide a solution for both the problem of in flight refueling and the problem of emergency in flight dumping of fuel and still avoid the unnecessary addition of weight to the craft, a system has been devised which is readily convertible by remote control to the exercise of either function desired.

Thus, one of the objects of the present invention is to provide a fluid handling system which employs the same structure to effectuate two different functions; namely, the receiving of liquids for storage and/or use aboard an aircraft in flight and the dumping of or the ejection of such stored liquids from said aircraft during flight without hazard.

Another object of the present invention is to provide positively controlled valving mechanisms to effectuate conversion of the fluid handling system either to permit the receiving of liquids in flight or to permit the dumping of liquids in flight.

A further object of the present invention is to provide a rotatable, extendable probe such that said probe may be extended and arranged in a substantially horizontal position for the refueling operation and also may be extended and arranged in a substantially vertical position for the emergency dumping operation at a distance below the aircraft.

Other objects and many of the attendant advantages of this invention will be readily appreciated as the same becomes better understood by reference to the following detailed description when considered in connection with the accompanying drawings wherein:

Fig. 1 is a schematic side view of a helicopter embodying the present invention having the probe thereof in the extended, substantially horizontal position employed during refueling;

Fig. 2 is a schematic side view of the helicopter of Fig. 1 with the probe in the extended, substantially vertical position employed during the emergency dumping of fuel;

Fig. 3 is a view on an enlarged scale of a practical embodiment of the present invention;

Figure 4:
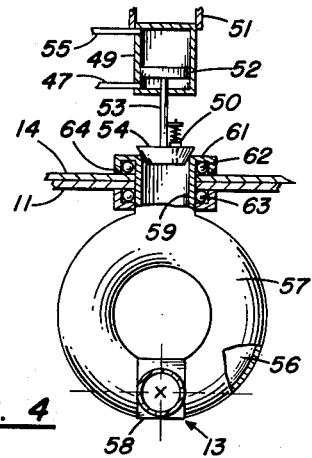
Fig. 4 shows a detail sectional view on an enlarged scale on the line 4—4 of Fig. 3.
Figure 5:
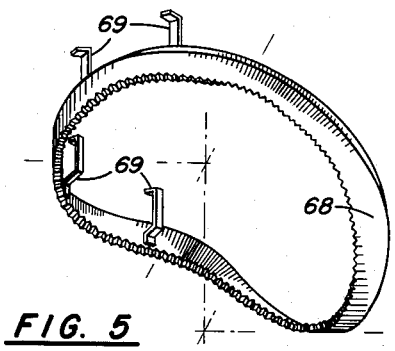
Fig. 5 is an isometric view of the warped rack for altering the position of the probe, the rack being viewed from below.
Figure 6:
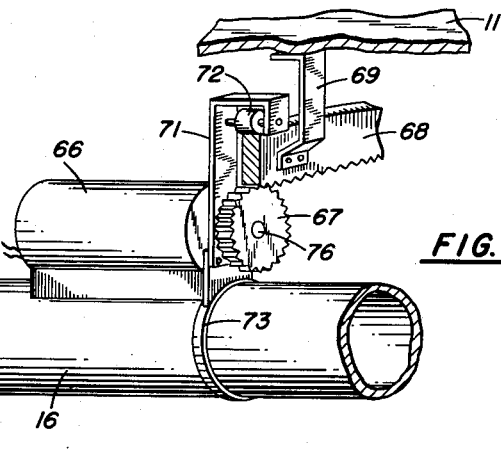
Fig. 6 shows an isometric view of the mechanism for controllably effecting travel of the probe along the warped rack.
Figure 7:
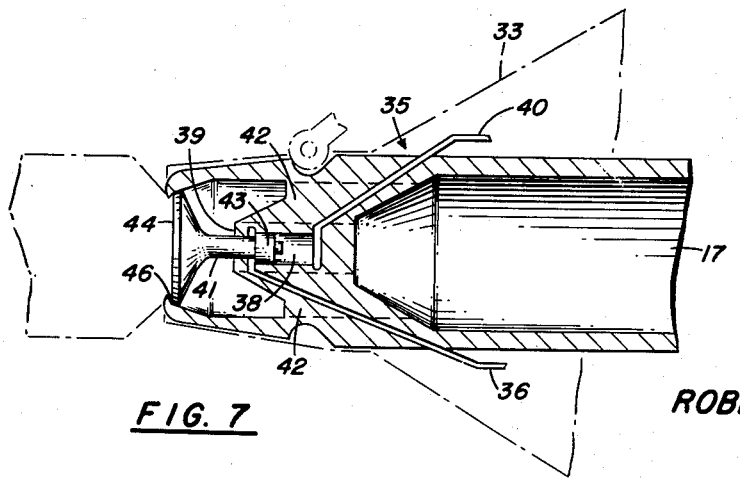
Fig. 7 is a view on an enlarged scale, in axial section, of the valving arrangement in the probe tip.

Referring to the drawings in detail, there is shown the preferred embodiment of the present invention. As indicated, a typical helicopter 11 is provided with a probe 12 universally mounted at joint 13, said probe 12 being adapted to communicate at one end thereof with fuel tank 14 within the craft 11 and at the other end thereof with the atmosphere.

Probe 12 comprises outer tube 16 and inner tube 17, inner tube 17 being constructed and arranged to telescope within outer tube 16 upon the introduction of hydraulic fluid under pressure into the annular space 18 between flange seal 19 and ring seal 21. Hydraulic fluid is admitted to annular space 18 through supply conduit 22, valve 24 and flexible conduit 23 upon the manual opening of valve 24, pressure for the fluid being supplied by pump 26. At one and the same time, valve 24 is adapted to place flexible conduit 27 out of communication with return conduit 28 to prevent the escape of fluid therethrough to return to sump 29.

Spring 31 within outer tube 16 is provided to react against flange seal 19 to continuously bias inner tube 17 to its extended position. Tooth 30 projecting into annular space 18 limits the outward movement of inner tube 17. Whenever valve 24 is so adjusted as to place flexible conduit 27 into communication with return conduit 28 (and thereby place supply conduit 22 and flexible conduit 23 out of communication) the biasing force of spring 31 against inner tube 17 forces the hydraulic fluid out of annular space 18 which is diminished in volume as inner tube 17 is moved to its extended position. The escaping fluid passes through flexible conduit 27, valve 24 and return conduit 28 and then into sump 29.

Clearly, during the operation of telescoping inner tube 17 into outer tube 16, the hydraulic pressure in annular space or cylinder 18 must be more than sufficient to overcome both the friction forces and the force of spring 31. Once the telescoping operation has been completed, the travel of inner tube 17 within outer tube 16 being limited by the space occupied by compressed spring 31 and/or limiting flange 32, pump 26 is shut off. If desired, a one-way valve (not shown) may be inserted in supply conduit 22 as an added precaution to prevent possible bleeding of fluid back through the idle pump.

During the usual refueling operation, probe 12 is arranged in its extended position as shown in Fig. 3. Assuming that the refueling connection has been affected in mid-air with the drogue 33 (shown in dotted lines) the valve 34 is moved manually so as to place flexible line 36 in communication with supply line 37. Hydraulic fluid is then forced under pressure from pump 26 to the forward end of hydraulic cylinder 38 located in boss 39 supported axially of probe nozzle 35 by radial webs 42. Double-acting piston 43 secured to valve stem 41 is movable axially in cylinder 38. As piston 43 is moved rearwardly by the admission of hydraulic fluid to the forward end of cylinder 38, nozzle valve 44 is moved rearwardly leaving valve seat 46. Thereupon fuel from the tanker (not shown) is free to enter probe nozzle 35 and enter probe 12. As piston 43 is moved rearwardly, hydraulic fluid in the rear portion of cylinder 38 is forced through flexible line 40, valve 34 and return line 45 to sump 29.

Simultaneously with the placing of flexible line 36 in communication with supply line 37 by valve 34, hydraulic fluid from pump 26 is free to pass under pressure from pump 26 through valve 34 and pipe 47 to the lower end of hydraulic cylinder 49. Cylinder 49 is supported within fuel tank 14 by a rigid structure such as bracket 51 depending from the top of tank 14. Piston 52 secured to valve stem 53 is arranged to be moved up or down in cylinder 49 by the force exerted by hydraulic fluid admitted to the bottom or top ends of cylinder 49. Upward movement of piston 52 results in the opening of valve 54 into fuel tank 14 simultaneously with the opening of nozzle valve 44. Upon these valves 44 and 54 being placed simultaneously in open position fuel may pass through probe nozzle 35, inner tube 17, outer tube 16, the annular passage 56 through universal joint 13 and into fuel tank 14 under pressure gradient from the tanker (not shown).

Once the refueling operation is completed, valves 44 and 54 are simultaneously placed in the closed position to prevent the escape of the fuel from tank 14. The closing of these valves is affected by manually moving valve 34 so as to place flexible line 40 in communication with supply line 37. When this has been accomplished, pressurized hydraulic fluid from pump 26 passes through supply line 37, valve 34 and line 40 to the rearward end of hydraulic cylinder 38 thereby moving piston 43 forward closing valve 44. At the same time, fluid passes through supply line 37, valve 34, line 40 and pipe 55 to the upper end of hydraulic cylinder 49 whereby piston 52 is moved in a downward direction closing valve 54.

Once valves 44 and 54 have been closed upon completion of the refueling operation, should it be desired to telescope probe 12, bleeder valve 50 in valve 54 is provided to allow the passage of fuel displaced from the probe during the telescoping procedure. Thus, bleeder valve 50 allows the passage of fuel into the tank only.

In order to perform the emergency dumping operation, probe 12 (either in its extended or retracted position) is rotated to a substantially vertical position. Also, during the refueling operation the necessity may arise for directing probe 12 at an angle to the longitudinal axis of craft 11 but still substantially in a plane perpendicular to the vertical axis of the craft. Universal joint 13 is provided with means to permit placing the probe 12 in these positions while consistently maintaining a path for the passage of fluid through joint 13. As shown in Fig. 4 outer tube 16 is attached to hollow, torus-like member 57 by means of hollow T-shaped connection 58 which is rotatably secured to member 57. Member 57 is rotatably connected to the body of craft 11 at fuel tank 14 by neck 59 provided with shoulder 61 passing through the body of craft 11 and through the shell of tank 14. Ball bearing support is provided by bearings 62 and 63. Seal 64 is provided to prevent leakage of fuel from tank 14. Thus, rotation of probe 12 substantially in a plane perpendicular to the vertical axis of craft 11 is permitted by bearings 62 and 63 while rotation of probe 12 to a substantially vertical position is permitted by the relative rotatability of connection 58 and member 57.

Though forming no part of this invention means can be provided for taking up and paying out flexible conduits 23 and 27 and flexible lines 36 and 40 during the extension or telescoping of probe 12 and during the positioning of the probe for refueling or dumping of fuel.

To effect the movement of probe 12 from the substantially horizontal position to the substantially vertical position, or vice versa, a positive drive is employed. Reversible electric motor 66 connected to the aircraft electrical system and secured to outer tube 16 drives pinion 67 along warped rack 68. Rack 68 depends from the underside of the craft by means of mounting brackets 69 and is so arranged that the teeth of rack 68 are equidistant from point X the center of rotation (see Figs. 3 and 4). To insure engagement between gear 67 and warped rack 68 bracket 71 is provided. This bracket has a roller assembly 72 which engages the top of rack 68 and provides means for linear movement of bracket 71 along rack 68. The lower end of bracket 71 is rigidly attached to collar 73 surrounding outer tube 16.

Thus, by energizing motor 66, probe 12 can be swung through a substantially horizontal arc of the magnitude of about 140°. Continuing the motor operation, the probe follows the rack around until it is in a substantially vertical position in which position emergency dumping of fuel can be effected. As there will, no doubt, be a possibility of interference between the swinging probe and the landing gear (not shown) it may be necessary to provide for retractable landing gear. This feature, however, forms no part of the present invention.

It is anticipated that the equipment described herein may also serve other functions entailing fluid handling such as the fighting of fires. The downwash of the helicopter rotor can prove helpful to direct smoke and flame away from the burning object while liquids ejected from the probe extinguish the fire.

Obviously many modifications and variations of the present invention are possible in the light of the above teachings. It is therefore to be understood that within the scope of the appended claims the invention may be practiced otherwise than as specifically described.

What is claimed is:

1. An inflight fluid handling system for aircraft comprising tank means, means forming an elongated telescopic passage, hollow toroidal shaped coupling means joining said tank means to said elongated telescopic means whereby passage communication is provided between the outer end of said elongated telescopic means and the interior of said tank means, said hollow coupling means being rotatable relative to said tank, said elongated telescopic means comprising at least a first and second tube, said second tube mounted within and coaxial with said first tube, a motor mounted on said first tube adjacent said hollow coupling means, said elongated telescopic means being rotatable relative to said hollow coupling in a plane substantially at right angles to the plane of rotation of said hollow coupling means, electrically driven rack and pinion means driven by said motor for controllably positioning said elongated means horizontally and vertically relative to said tank, first valve means in said elongated means, second valve means in said tank, said first and second valve means being constructed and arranged to be controllably moved to a sealing position and to an open position whereby passage communication between the outer end of said elongated means and the interior of said tank means is sealed off and opened, and hydraulic control means which is remotely operable for said first and second valve means.

2. A system substantially as set forth in claim 1 wherein said hydraulic control means simultaneously operates the first and second valve means to either a sealing position or to an open position.

3. A system substantially as set forth in claim 2 with the means forming an elongated telescopic passage comprising a probe composed of a plurality of concentric tubes having different diameters, said tubes being constructed and arranged to form a piston and cylinder in telescoping relation and contain a biasing spring therebetween and fluid pressure means in cooperation with said spring to control the telescoping action.

4. In combination, a helicopter and an inflight fluid handling system for aircraft comprising tank means operatively connected to said helicopter, means forming an elongated telescopic passage, hollow toroidal shaped coupling means joining said tank means to said elongated telescopic means whereby passage communication is provided between the outer end of said elongated telescopic means and the interior of said tank means, said hollow coupling means being rotatable relative to said tank, said elongated telescopic means comprising at least a first and second tube, said second tube mounted within and coaxial with said first tube, a motor mounted on said first tube adjacent said hollow coupling means, said elongated telescopic means being rotatable relative to said coupling in a plane substantially at right angles to the plane of rotation of said hollow coupling means, electrically driven rack and pinion means driven by said motor for controllably positioning said elongated means horizontally and vertically relative to said tank, first valve means in said elongated telescopic means, second valve means in said fuel tank, said first and second valve means being constructed and arranged to be controllably moved to a sealing position and to an open position whereby passage communication between the outer end of said elongated telescopic means and the interior of said tank means is sealed off and opened, and hydraulic control means which is remotely operable for said first and second valve means.

5. A system substantially as set forth in claim 4 wherein said hydraulic control means simultaneously operates the first and second valve means to either a sealing position or to an open position.

6. A system substantially as set forth in claim 4 with the means forming an elongated telescopic passage comprising a probe composed of a plurality of concentric tubes having different diameters, said tubes being constructed and arranged to form a piston and cylinder and contain a biasing spring therebetween and fluid pressure means in cooperation with said spring to control the telescoping action.

References Cited in the file of this patent

UNITED STATES PATENTS

| | | |
|---|---|---|
| 2,440,758 | Pitcairn | May 4, 1948 |
| 2,692,102 | Cobham et al. | Oct. 19, 1954 |
| 2,879,016 | Haase | Mar. 24, 1959 |
| 2,880,749 | Brown | Apr. 7, 1959 |

FOREIGN PATENTS

| | | |
|---|---|---|
| 795,517 | France | Jan. 8, 1936 |
| 695,200 | Great Britain | Aug. 5, 1953 |
| 767,138 | Great Britain | Jan. 30, 1957 |